US006981836B2

(12) United States Patent
Tomko et al.

(10) Patent No.: US 6,981,836 B2
(45) Date of Patent: Jan. 3, 2006

(54) APPARATUS AND METHODS FOR REMOVING AND INSTALLING AN UPPER DIAPHRAGM HALF RELATIVE TO AN UPPER SHELL OF A TURBINE

(75) Inventors: Andrew John Tomko, Glenville, NY (US); John Francis Nolan, Latham, NY (US); Karl Rudolph Anderson, III, Plainfield, IL (US)

(73) Assignee: General Electric Company, Schenectady, NY (US)

( * ) Notice: Subject to any disclaimer, the term of this patent is extended or adjusted under 35 U.S.C. 154(b) by 178 days.

(21) Appl. No.: 10/423,982

(22) Filed: Apr. 28, 2003

(65) Prior Publication Data

US 2004/0213653 A1 Oct. 28, 2004

(51) Int. Cl.
*B66F 11/00* (2006.01)
*B23P 19/04* (2006.01)

(52) U.S. Cl. ...................... 414/589; 414/458; 414/590; 29/889.1

(58) Field of Classification Search ............ 29/402.03, 29/426.1, 888.021, 889.1; 414/10, 458, 589, 414/590; 410/2, 47; 280/79.1; 254/2 C, 254/10 C See application file for complete search history.

(56) References Cited

U.S. PATENT DOCUMENTS 2,920,773 A * 1/1960 Knabe ........................ 414/743
2,931,519 A * 4/1960 Beach ........................ 414/589
3,121,499 A * 2/1964 Barre, Jr. .................... 414/542
4,400,133 A * 8/1983 Booker ........................ 414/589
4,440,265 A * 4/1984 Spagnoli ...................... 182/129
4,451,979 A * 6/1984 Schuster ...................... 29/824
4,461,455 A * 7/1984 Mills et al. ................. 254/3 R
4,567,649 A * 2/1986 Ades et al. ................... 29/800
4,664,586 A * 5/1987 Vassalotti ................... 414/590
4,787,788 A * 11/1988 Versteeg ...................... 410/49
5,575,607 A * 11/1996 Grout et al. ................... D11/4
5,823,745 A 10/1998 Anderson, III et al.
5,870,824 A * 2/1999 Lilja et al. ................. 29/889.1
6,325,596 B1 12/2001 Tomko
6,352,405 B1 3/2002 Tomko
6,390,762 B1 * 5/2002 Peery et al. ................ 414/589
6,431,319 B1 * 8/2002 Myers et al. ............... 187/243
6,485,247 B1 * 11/2002 Groves et al. .............. 414/589

* cited by examiner

*Primary Examiner*—James W. Keenan
(74) *Attorney, Agent, or Firm*—Nixon & Vanderhye, P.C.

(57) ABSTRACT

A pair of stands are spaced one from the other to support opposite ends of an upper shell and diaphragm halves of a turbine at locations along the upper shell axially beyond the diaphragm halves. Carts mounted on wheels each have a hydraulically actuated lift and a platform mounting support assemblies engagable with an upper diaphragm half at the midline. By engaging a diaphragm half from below the upper shell, securing the support assemblies to the upper diaphragm half and releasing the upper diaphragm half from the upper shell by removing bolts and keys to transfer the weight of the diaphragm half to the cart, the diaphragm half may be lowered from the upper shell and moved away. The diaphragm halves may then be refurbished and the process reversed to reinstall the diaphragm halves into the upper shell. During the process, the upper shell remains in its normal orientation, similarly as in the turbine.

14 Claims, 8 Drawing Sheets

APPARATUS AND METHODS FOR REMOVING AND INSTALLING AN UPPER DIAPHRAGM HALF RELATIVE TO AN UPPER SHELL OF A TURBINE

BACKGROUND OF THE INVENTION

The present invention relates to a system for removing diaphragm halves from an upper shell of a turbine, moving the removed diaphragm halves to a location for refurbishing, and reinstalling the refurbished diaphragm halves into the upper shell.

Turbines, for example steam turbines, periodically require maintenance and generally include upper and lower shells which must be separated from one another along a horizontal midline for that purpose. As will be appreciated, each stage of a turbine includes an annular diaphragm split in half to provide upper and lower diaphragm halves in the upper and lower shells, respectively. The diaphragm halves in the upper shell are typically secured in the upper shell by bolt and key keeper arrangements located adjacent the midline horizontal joint along opposite sides of the turbine. Consequently, when maintenance is required, the upper turbine shell is unbolted from the lower shell and the upper shell, including the upper diaphragm halves secured therein, is lifted from the lower shell.

One heavy duty crane is generally employed to lift the upper shell and associated upper diaphragm halves from the lower shell. Using two cranes, the upper shell, including the diaphragm halves, is then inverted to enable the diaphragm halves to be lifted from the upper shell. Conventionally, this inversion process requires a lifting of the upper shell, a rotating of the shell 180° about a horizontal axis, followed by a lay-down of the upper shell on a stand. At many sites for turbines, bridge cranes are not available and two boom-type cranes are required for this lifting process. It will be appreciated that the requirement for two cranes substantially increases the cost of performing the maintenance as well as the outage time. It will also be appreciated that the weight of the upper turbine shell and associated diaphragm halves is substantial. For example, a typical turbine upper shell having thirteen upper diaphragm halves may weigh approximately 90,000 pounds with each upper diaphragm half weighing approximately 1,000 pounds. While a smaller crane may be used to lift the individual diaphragms from the inverted upper shell, it is still necessary to deploy two cranes, in the absence of a bridge crane, to remove and invert the upper shell. Consequently, there has arisen a need for a system for inspecting, maintaining and refurbishing the diaphragm halves of the upper shell of turbines at reduced costs and minimal outage time.

BRIEF DESCRIPTION OF THE INVENTION

In a preferred embodiment of the present invention, there is provided a system for removing the upper diaphragm halves from the upper shell of the turbine without inverting the upper shell and replacing refurbished or new diaphragm halves into the upper shell, similarly without inverting the upper shell. To accomplish the foregoing, there is provided a support structure for the upper shell and diaphragm halves. Additionally, individual carts are provided for facilitating the removal of each diaphragm half from the upper shell, refurbishment of the removed diaphragm half and reinstallation of the refurbished or a new diaphragm half into the upper shell. The support structure includes a pair of stands, each having an elongated beam supported by stabilizing and leveling legs and feet. A crane is used to lift the upper shell and associated diaphragm halves from the lower shell and set the horizontal joint faces of the upper shell on the beams. The beams lie at an elevation enabling access to the upper shell and upper diaphragm halves by workmen from below to the horizontal midline of the upper shell and diaphragm halves. That is, the stands support the upper shell and diaphragm halves at a height convenient for cleaning and inspecting the horizontal joint of the upper shell and to remove and install the upper diaphragm halves. Consequently, the pair of stands are designed to support the entire weight of the upper shell and diaphragm halves at an elevation approximately six feet above floor or ground level. Consequently, inspection and cleaning along the horizontal midline of the upper shell by workmen below the shell are facilitated.

The system also includes a plurality of carts for removing the diaphragm halves from the upper shell, moving the carts and diaphragm halves to locations for inspection and refurbishment and enabling the reinstallation of the refurbished diaphragm halves or one or more new diaphragm halves into the upper shell, all being accomplished while the upper shell remains supported on the stands. Each cart preferably includes a base mounted on wheels or rollers, for example, balloon tires, and an upper support platform for supporting a diaphragm half. The cart also includes support elements pivotally coupled to one another in a scissors-type lift arrangement located between the cart base and the platform. A fluid-actuated cylinder cooperates with the support elements to extend and retract the platform relative to the cart base. Consequently, the support platform, in a lowered position, enables the cart, with or without a diaphragm attached, to be moved into position underlying a selected diaphragm half within the upper shell. By actuating the cylinder, the platform of the cart may be raised either to engage with the horizontal midline of the selected diaphragm half or to install a diaphragm half.

Mounted on the platform is an attachment assembly which includes support block assemblies mounted on the attachment assembly for movement in longitudinal and transverse directions to support the diaphragm half. This horizontal and transverse movement of the support block assemblies enables the support blocks to be adjusted in position depending upon the stage of the diaphragm half being removed. It will be appreciated that the upper diaphragm halves of the turbine stages have different horizontal midline configurations including obstructions at their midlines. The support block assemblies are therefore adjustable to enable each platform to engage and accommodate the different configurations and obstructions of each diaphragm half whereby the support block assemblies are common to the different configurations of the diaphragm halves at their midlines. The carts preferably also have outrigger assemblies such that the floor or ground supporting footprint of the carts can be enlarged to afford greater stability to the carts when the diaphragm halves are supported by the carts. In a preferred embodiment, the outrigger assemblies include telescoping legs mounting the wheels of the cart between extended and contracted positions. Also, the lifting system for each cart includes hydraulics and the scissors arrangement encased in an enclosure between the base of the cart and the platform. The enclosure may, for example, take the form of a bellows. The enclosure serves to protect the lift mechanism and hydraulic system during cleaning and servicing of the upper shell and diaphragm halves.

To employ the system thereof, the upper and lower shells are unbolted from one another, and the upper shell and upper diaphragm halves are lifted by a crane for disposition on the stands. The orientation of the upper shell remains as it was in the turbine with the upper diaphragm half midlines facing downwardly. It will be appreciated that the bolt and key arrangements maintain the diaphragm halves in the upper shell and prevent them from falling out of the upper shell. Once the upper shell is placed on the stands, a cart with its platform in a retracted position is disposed below the upper shell and in vertical registration with a diaphragm half to be removed. The cylinder is actuated to engage the platform and the upper diaphragm half along its midline and bolts are inserted into existing bolt holes of the upper diaphragm half to secure the upper diaphragm half to the platform. By subsequently incrementally elevating the platform, the weight of the upper diaphragm half secured to the platform is transferred to the cart. The bolt and key arrangements are then removed to release the upper diaphragm half from the upper shell. The cylinder is then actuated to retract or lower the platform and the diaphragm half secured thereto. When the diaphragm half clears the lower margin of the upper shell, the cart is moved from below the upper shell and from between the stands to another location for servicing. A similar cart is used for removing and refurbishing each of the diaphragm halves whereby all of the diaphragm halves of the upper shell can be removed for servicing without inversion of the upper shell.

Once the diaphragm halves are refurbished, they are reinstalled into the upper shell by a reverse process. That is, each cart is, in sequence, registered below the semi-annular recess for receiving the associated diaphragm half. By actuating the cylinder, the platform and diaphragm half are elevated to locate the diaphragm half in the upper shell recess. The bolt and keepers are installed between the upper shell and diaphragm half adjacent their midlines. The bolts between the diaphragm half and the attachment assembly are removed and the platform with its mounted attachment assembly is lowered to transfer the weight of the diaphragm half from the cart to the bolt and keeper arrangement and hence the upper shell. The cart is then removed.

It will be appreciated from the foregoing that while a crane is needed to lift the upper shell and diaphragms from the lower shell, a second crane is not necessary to invert the upper shell. Additionally, with the foregoing arrangement, the midline joints of the upper shell can also be readily refurbished by workmen from positions below the upper shell.

In a preferred embodiment according to the present invention, there is provided in a system for removing and replacing diaphragm halves for a turbine wherein the diaphragm halves have varied midline joints along various turbine stages, a support structure for receiving the diaphragm halves of the turbine comprising a cart having a base and a plurality of wheels for movably supporting a diaphragm half carried by the cart, an attachment assembly carried by the base for vertical movement relative to the base, a lift mechanism connected between the base and the attachment assembly for moving the attachment assembly vertically relative to the base, the attachment assembly including a pair of support assemblies for supporting the diaphragm half, each support assembly including at least one support carried by the attachment assembly for movement in at least one horizontal direction to accommodate the varied configurations of midline joints of the diaphragm halves of the various turbine stages and to support the diaphragms from the platform, the attachment assembly including a pair of fasteners for securing the attachment assembly and diaphragm half to one another with the support assemblies therebetween.

In a further preferred embodiment according to the present invention, there is provided a system for removing diaphragm halves from and replacing diaphragm halves into an upper shell of a turbine comprising a pair of stands spaced one from the other for supporting opposite ends of the upper shell with horizontal midlines thereof resting on the stands, respectively, a plurality of carts having a plurality of wheels for movement between the stands and below the upper shell, an attachment assembly carried by the cart and mounted for vertical movement relative to the cart, a lift mechanism carried by the cart for raising and lowering the attachment assembly, the attachment assembly including fasteners for securing the attachment assembly and a selected one of the diaphragm halves to one another, enabling the one diaphragm half for removal from the upper shell and movement of the one diaphragm half and cart laterally of the stands and upper shell.

In a further preferred embodiment according to the present invention, there is provided a method of removing a diaphragm half from an upper shell of a turbine comprising the steps of a) removing the upper shell and diaphragm halves within the upper shell from a lower shell of the turbine, b) disposing opposite ends of the upper shell with diaphragms therein on a pair of spaced elevated stands, c) locating a cart between the stands and below a selected one of the diaphragm halves, d) elevating a support on the cart to engage the one diaphragm half and transfer the weight of the one diaphragm half onto the cart support, e) releasing the one diaphragm half from the upper shell and f) lowering the support and diaphragm half to a level below the upper shell.

DETAILED DESCRIPTION OF THE INVENTION

Figure 1:
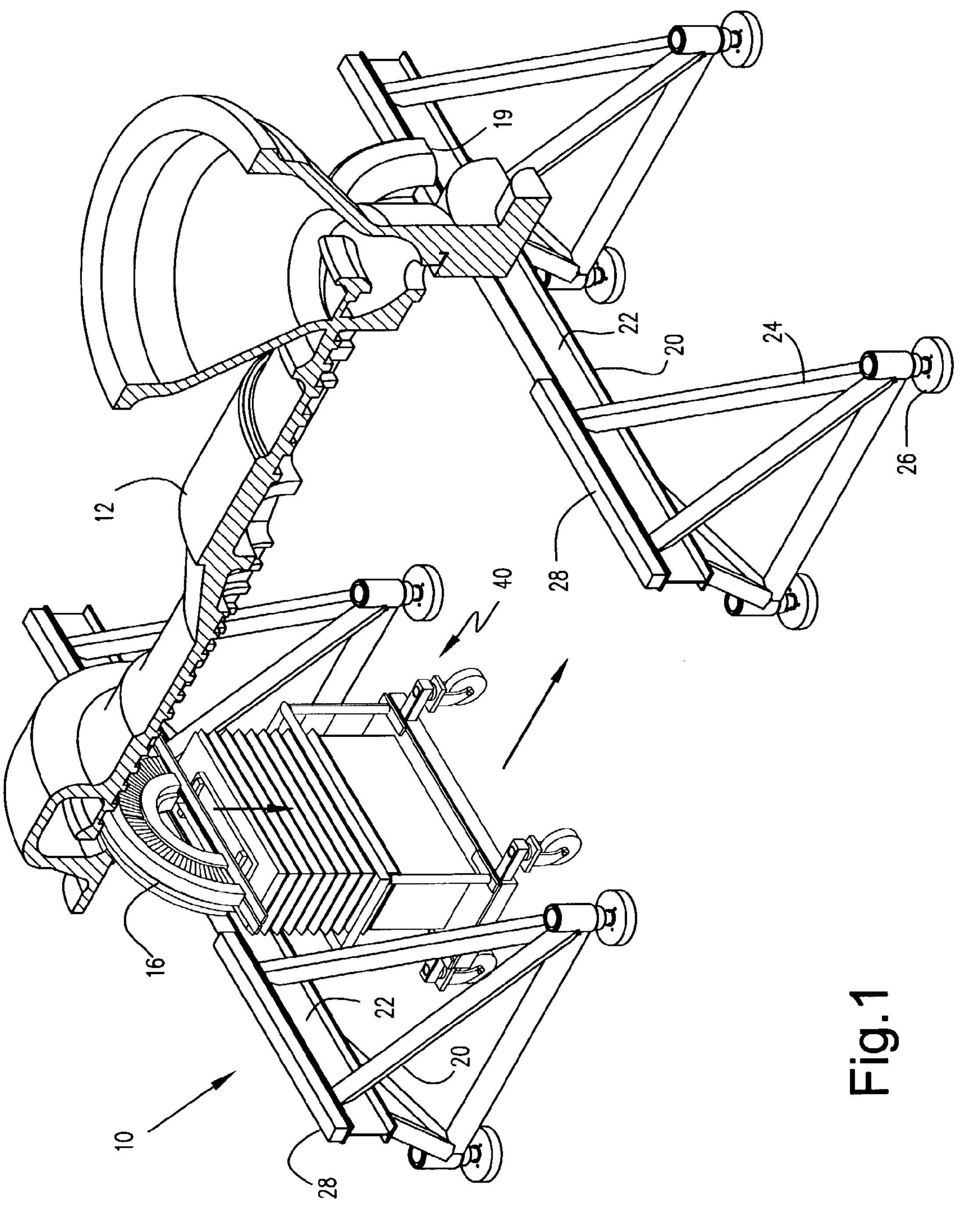
FIG. 1 is a perspective view with parts broken out and in cross-section of an upper shell of a turbine illustrating a single diaphragm half about to be removed from the upper shell.
Figure 2:
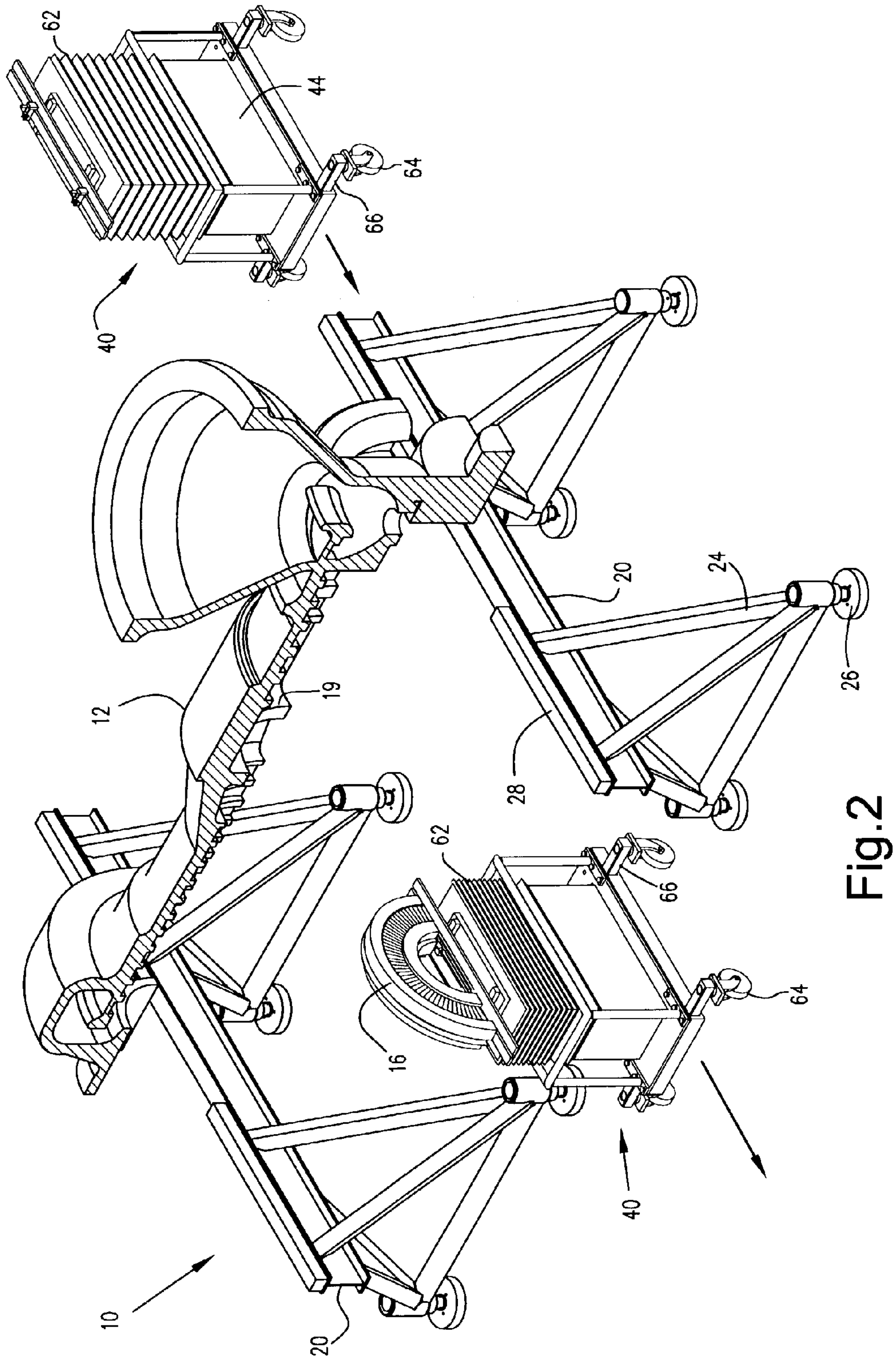
FIG. 2 is a view similar to FIG. 1 illustrating a cart removing the diaphragm half from below the upper shell and an additional cart moving into position to remove another diaphragm half, the remaining diaphragm halves to be removed from the upper shell not being shown for clarity.

Referring now to the drawings, particularly to FIG. 1, there is illustrated a system for removing upper shell diaphragm halves to and from the upper shell of a turbine and reinstalling refurbished or new upper shell diaphragm halves into the upper shell, the system being generally designated

10. Illustrated in FIG. 1, in partial cross-section, is an upper shell 12 of a turbine, for example, a steam turbine. As will be appreciated, upper shell 12 has a horizontal midline joint 19 in a plane along the axis of the turbine. In FIG. 1, the midline joint faces downwardly, similarly as its orientation when secured to the lower shell, not shown, of the turbine. Also in FIG. 1, there is illustrated an upper diaphragm half 16 forming in part one of the multiple stages of the turbine. The lower shell, not shown, of the turbine likewise includes a horizontal midline joint, and the upper and lower shells are bolted one to the other along the corresponding horizontal midline joints. The lower shell, of course, houses the lower diaphragm halves, not shown, which form with the upper diaphragm halves upon assembly, annular diaphragms, in turn, forming portions of the multiple stages of the turbine.

Figure 3:
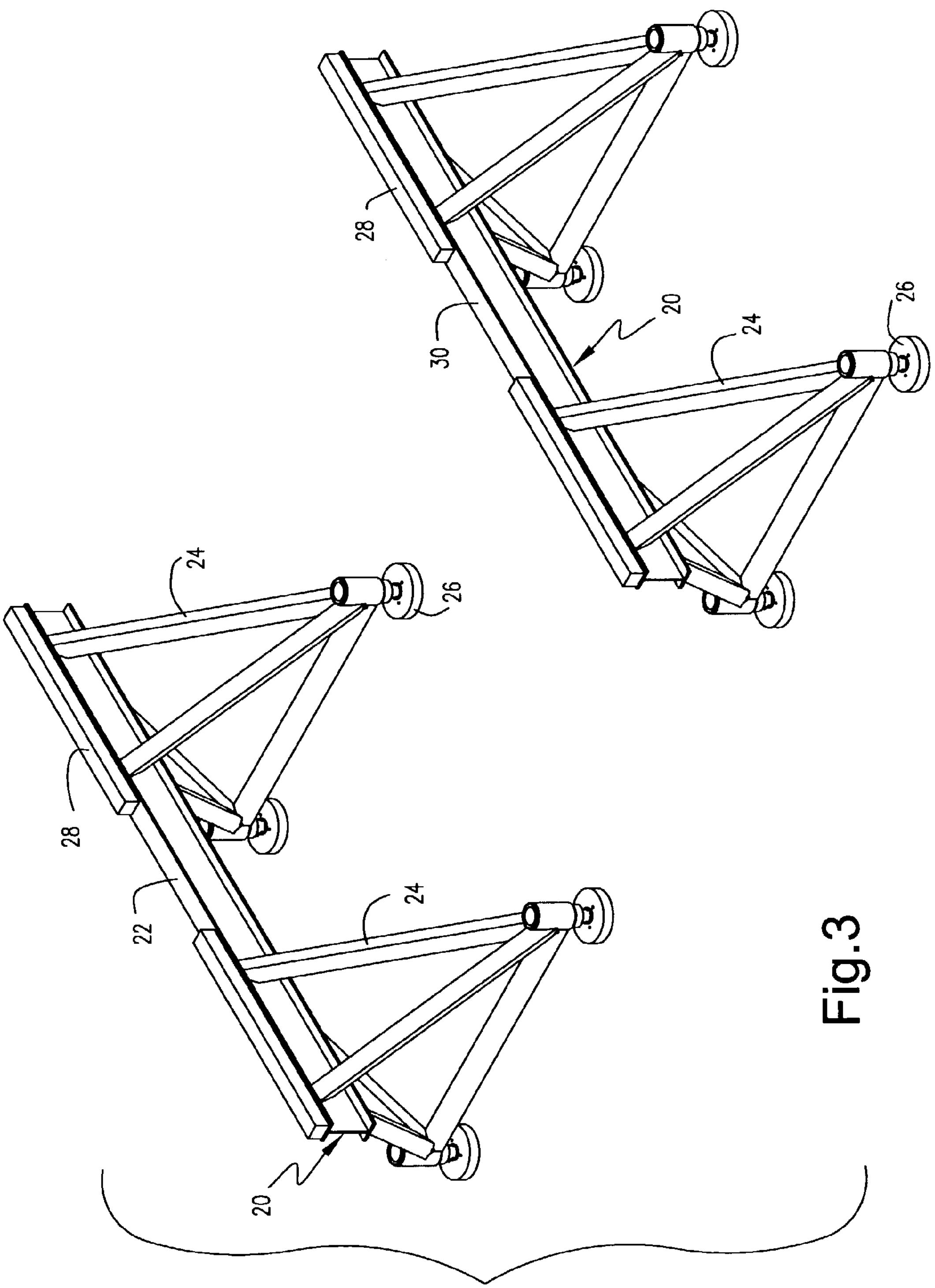
FIG. 3 is a perspective view illustrating a pair of support stands forming part of the system hereof.

The system 10 hereof includes a pair of support stands 20. Each support stand, as best illustrated in FIG. 3, includes a horizontally extending beam 22. Four angled legs 24 are provided at each of the opposite ends of the beam 22, terminating at their lower ends in feet 26. The feet 26 are coupled to the legs by leveling screws and are also pivotal relative to the legs 24. In this manner, the need for leveling of the stands with shims and to compensate for uneven floor or ground levels is eliminated. The stands 20 are formed to carry substantial weight. For example, the stands are designed and formed of materials to support a weight of an upper turbine shell with all its diaphragm halves secured therein on the order of 90,000 pounds and higher. The stands can therefore be constructed to support substantially as great a weight as needed. Wood blocks 28 are also provided on each of the upper surfaces of the beams adjacent opposite ends of the beams for receiving the upper shell 12 to protect the shell joint surface 19.

Figure 4:
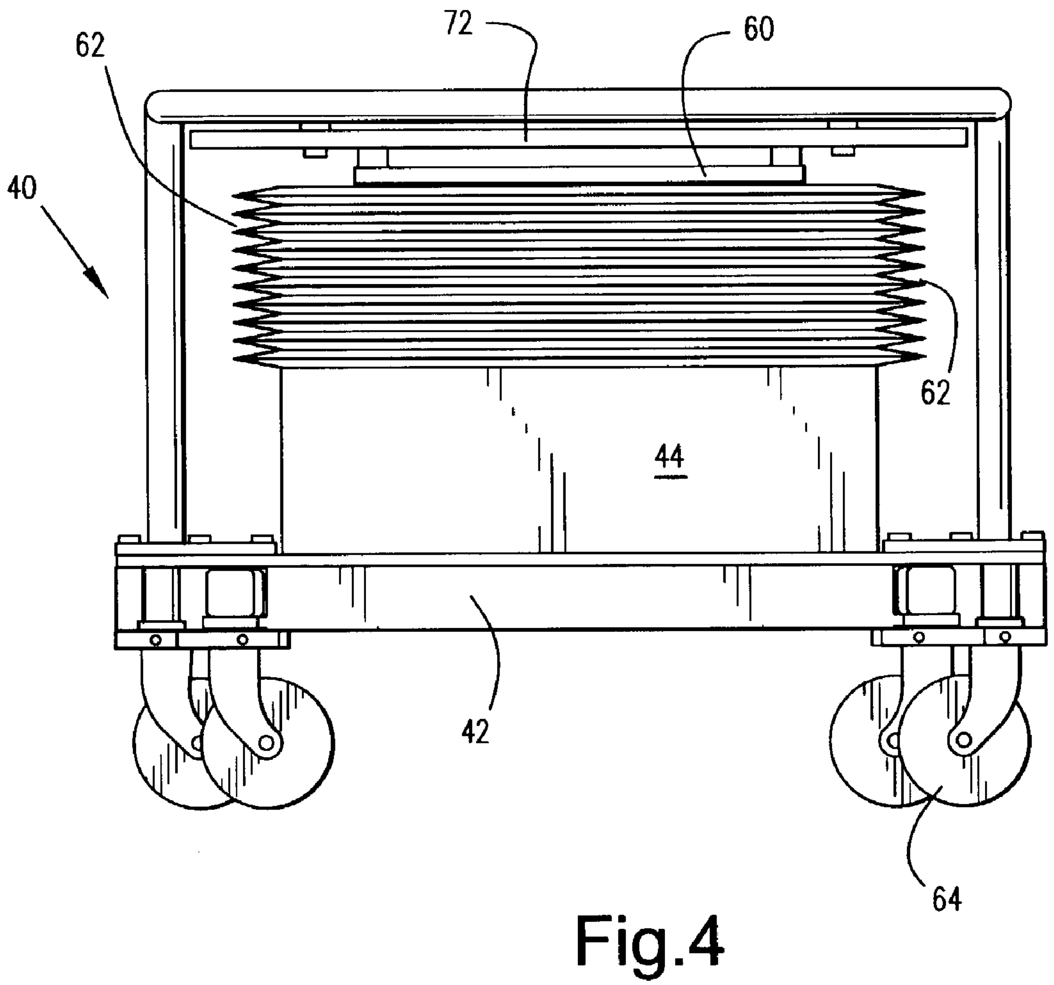
FIG. 4 is a side elevational view illustrating a cart forming part of the system hereof with its lift mechanism in a retracted position.
Figure 5:
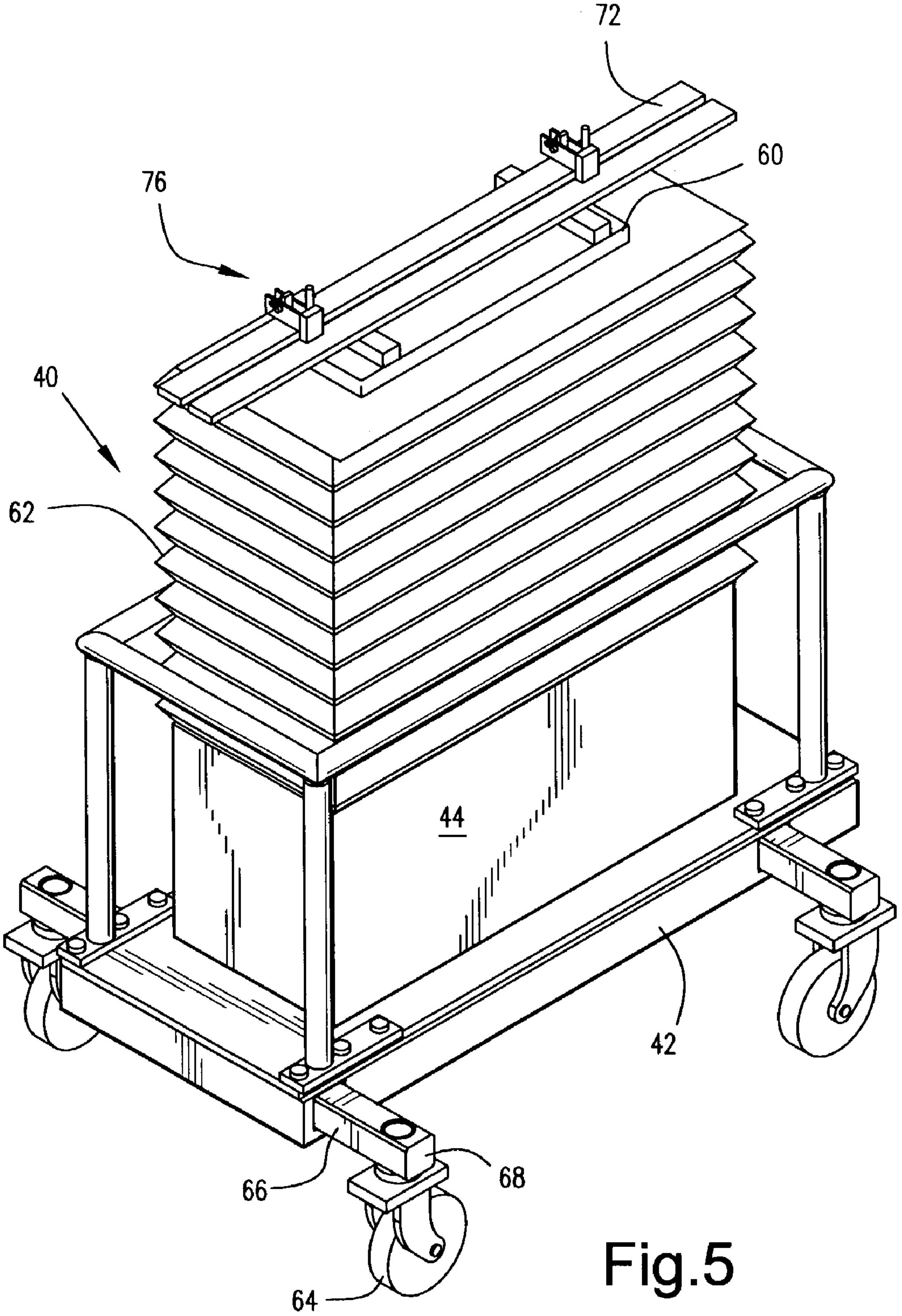
FIG. 5 is a perspective view of the cart with the lift mechanism illustrated in an extended position.
Figure 6:
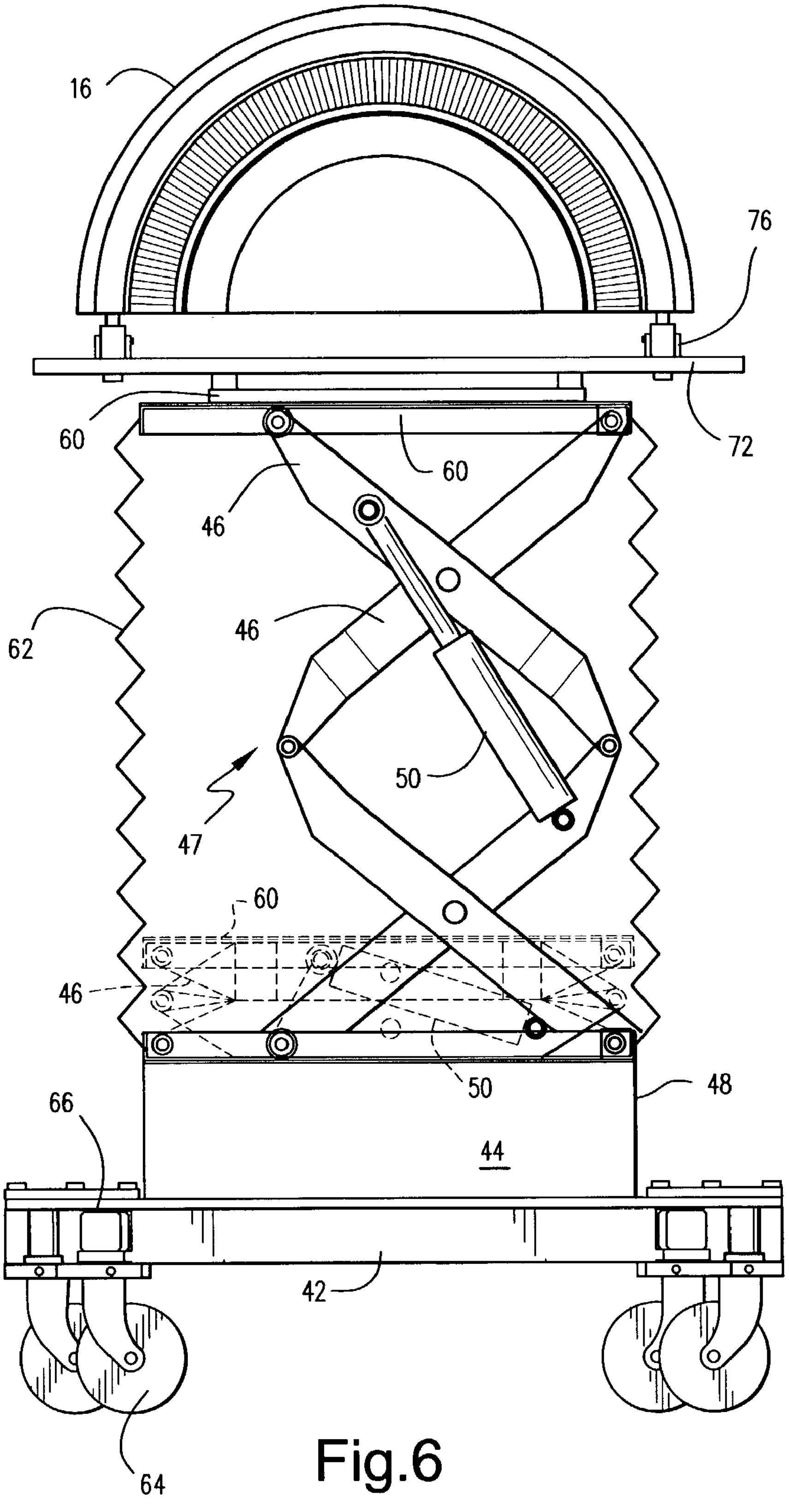
FIG. 6 is an elevational view of the cart supporting a diaphragm half with the lift mechanism in an extended position.

Referring to FIGS. 4–6, the system 10 hereof also includes a support structure comprised of a plurality of carts generally designated 40. Each cart 40 includes a base 42 having a housing 44 mounted on the base and carrying hydraulic hoses and a quick release connector.

A plurality of side by side linkages or elements 46 (FIG. 6) are pivoted one to the other to form a scissors-type vertically movable lift mechanism, generally designated 47. The lowermost elements of the scissors-type arrangement are structurally supported by the housing 44 and base 42. A motor and hydraulic pump 48 and ancillary equipment, not illustrated, are remotely located from the carts 40. The motor and hydraulic pump enables actuation of a fluid actuated cylinder 50 interconnecting elements 46 of the scissors lift mechanism 47. It will be appreciated that by extending the cylinder and piston 50 relative to one another, the elements 46 are pivoted and raised relative to the base 42. By contracting the piston and cylinder 50, the elements 46 are lowered onto the housing 44 as illustrated also by the dashed lines in FIG. 6. The quick release connector, not shown, is accessed in housing 44 by a spring biased access door, not shown, enabling protection from contamination during refurbishing. Support elements 46 are pivotally connected at their upper ends to an attachment assembly 59 including a platform 60 and support block assemblies 76 described below. The elements 46 and hydraulic cylinder 50 are also disposed within a flexible enclosure 62, for example, a bellows-type enclosure which expands and contracts as platform 60 is raised or lowered, respectively, relative to housing 44. Enclosure 62 maintains the elements and hydraulic equipment free of contamination during refurbishing. The cart base 42 is also supported on wheels 64, preferably pneumatic tires, which are mounted on telescopic legs 66 (FIG. 5). The legs 66 and wheels 64 mounted thereon constitute outrigger assemblies 68 whereby the legs 66 can be extended from the base 42 to enlarge the footprint of the cart on the ground or floor and retracted to reduce that footprint. By extending the outriggers, enhanced stability is afforded to the carts during raising, lowering and transport of the diaphragm halves. The outriggers in a retracted position facilitate storage of the carts.

Figure 7:
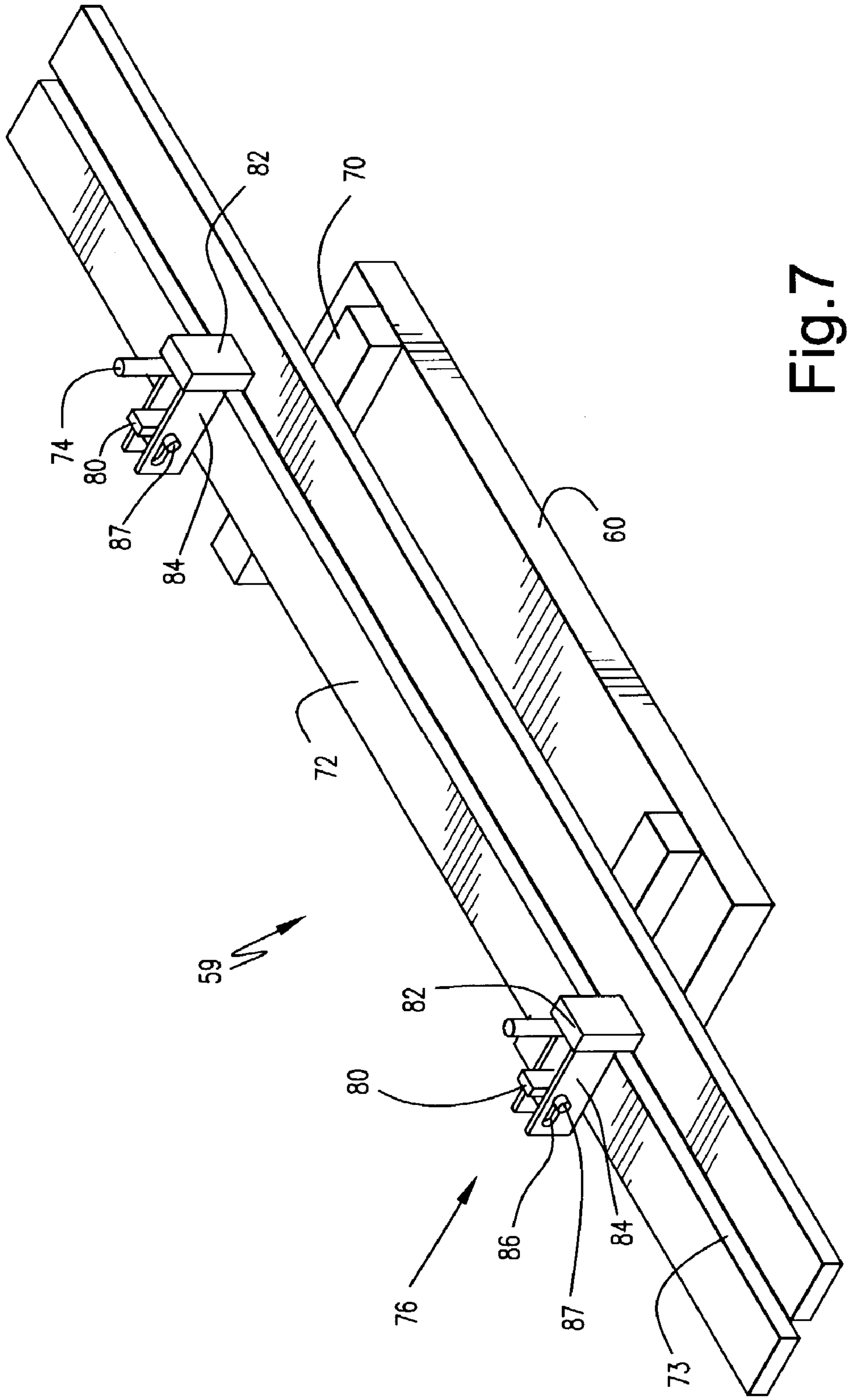
FIG. 7 is a perspective view of the attachment assembly on the platform of the cart.
Figure 8:
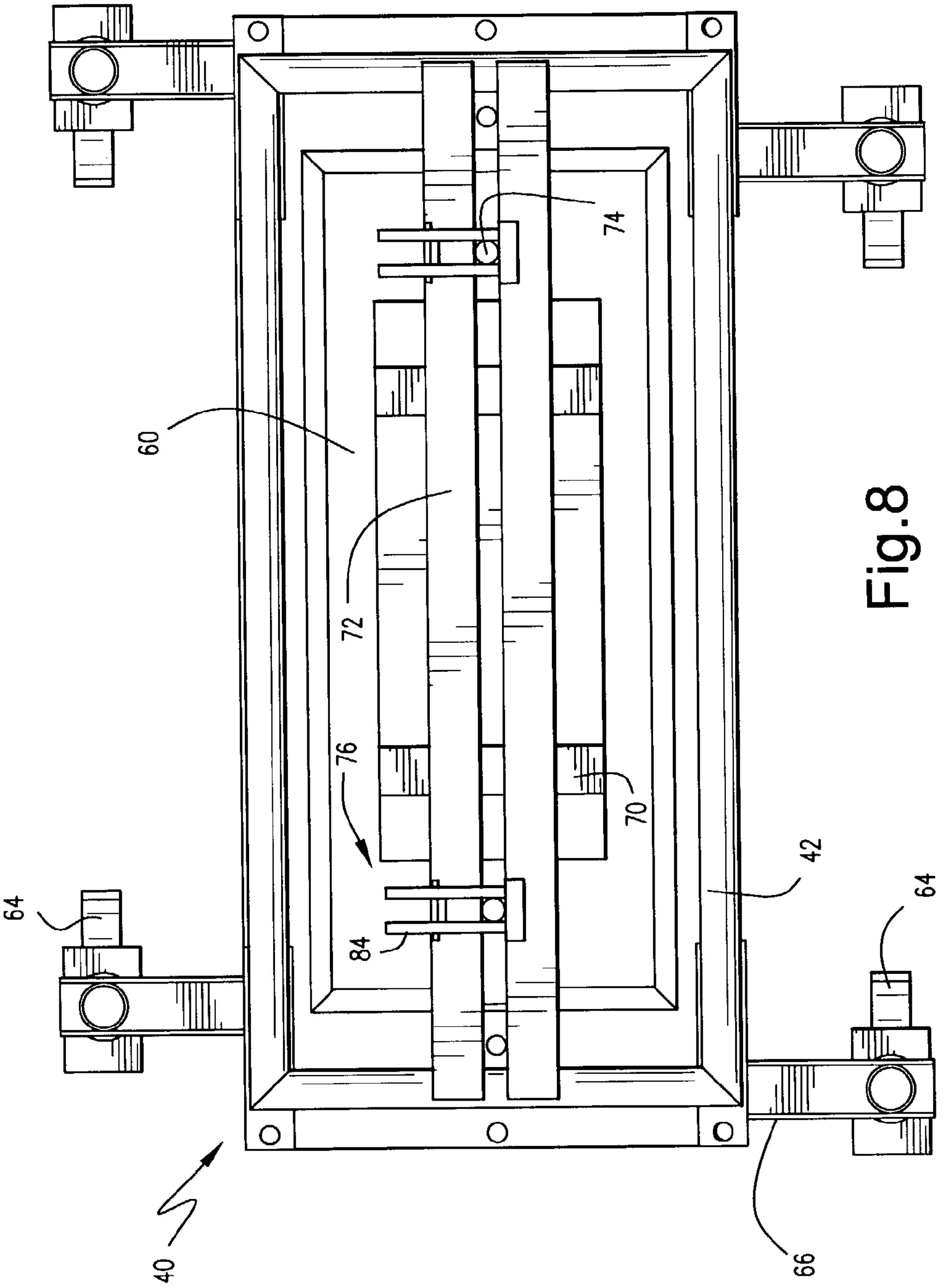
FIG. 8 is a top plan view of the cart.

Referring to FIG. 7, the attachment assembly 59 includes a pair of laterally spaced bars 70 supporting a pair of longitudinally spaced crossbars 72. Fasteners, e.g., bolts 74, project upwardly from below the crossbars 72 and in the slot 73 between the crossbars 72. The bolts 74 are slidable along the slot 73. Bolts 74 comprise parts of a pair of support block assemblies generally designated 76, having one or more support blocks movable transversely along the crossbars 72. Thus, the support block assemblies 76 include a pair of supports, e.g., blocks 80 and 82, for engaging between the horizontal midline of the upper diaphragm half and the crossbars 72. The support block 80 is movable longitudinally, i.e., parallel to the turbine centerline, relative to the support block 82. That is, support block 80 is captured by the support block assembly 76 by a pair of plates 84 extending from block 80. Plates 84 have slots 86 for receiving screws 87 projecting from opposite sides of support block 80. Thus, block 80 is slidable longitudinally relative to support block 82. The bolts 74 are located between the plates 84 and the blocks 80 and 82 and in the slot 73. Consequently, each assembly 76 is movable transversely and the block 80 is additionally movable longitudinally, i.e., axially relative to the turbine centerline.

It will be appreciated that each of the horizontal midlines of the upper diaphragm halves has a different configuration of holes for receiving the bolts 74 as well as differently located obstructions depending upon the stage in which the diaphragm half is located. The support block assemblies 76 accommodate the different positions of the bolt receiving holes and obstructions and thus, are common to and useful for supporting each of the diaphragm halves of the upper shell notwithstanding their different configurations. The support block assemblies 76 are part of the attachment assembly 59 and are thus also mounted for vertical movement with the platform 60. It will be appreciated that a cart 40 is provided for each of the diaphragm halves to be removed. For example, if the diaphragm halves of stages 3–11 of a turbine are to be removed, nine carts are preferably provided such that each diaphragm half can be removed from the upper shell, refurbished, and subsequently reinstalled in the upper shell using the same cart. This facilitates the refurbishing process because the diaphragm halves can be displaced directly from the upper shell onto the carts, maintained on the carts while refurbishing takes place, and then reinstalled directly from the carts into the upper shell. No additional support or lift, such as a crane, is necessary.

In order to utilize the system hereof, the stands 20 are spaced longitudinally one from the other to underlie and support the opposite ends of the upper shell at locations longitudinally beyond the upper diaphragm halves to be removed from the upper shell. The stands are also leveled. With the stands set up for receiving the upper shell and upper half diaphragms, the upper shell is unbolted from the lower shell of the turbine. A crane, not shown, is then used to lift the upper shell including the upper shell diaphragm halves from the lower shell and set the upper shell and diaphragm halves on the stands. The stands thus support the upper shell and upper diaphragm halves at an elevation, for example, about six feet above ground or floor level, such that workmen can stand below the upper shell and the upper diaphragm halves assembled therein when the upper shell is supported on the stands. The upper diaphragm halves are then accessible for packing removal and horizontal joint inspection and repair.

To remove the upper diaphragm halves from the upper shell, one of the lift carts is maneuvered under the upper shell, between the stands 20, and positioned under, i.e., in vertical registration with, the diaphragm to be removed. The outriggers of the cart are extended to provide improved stability to the carts when the weight of a diaphragm half is transferred to the cart. The fluid cylinder 50 is then actuated to elevate the platform 60. When elevating the platform 60, the support block assemblies 76 and particularly the bolts 74 are aligned with corresponding lifting bolt holes in the horizontal midline of the upper diaphragm halves. When the support blocks 80 and 82 are adjusted and engage the horizontal midline surface of the diaphragm half, the bolts 74 are threaded into the upper diaphragm half and tightened down to secure the diaphragm half to the platform and hence the cart. The platform and the supported diaphragm half are then incrementally elevated to transfer the weight of the diaphragm half from the upper shell to the cart. The bolt and key arrangements for maintaining the upper diaphragm half in the upper shell are then disconnected at the horizontal midline. Once the bolt and key arrangements are disconnected and cleared, the hydraulic system is actuated to lower the platform carrying the diaphragm half, thus removing the diaphragm half from the semi-annular recess in the upper shell housing the diaphragm half. When the diaphragm half clears the lower edge of the upper shell, the cart carrying the diaphragm half is then moved from below the upper shell and between the stands to another location for refurbishing. The process is repeated for each diaphragm half using a separate cart until eventually, each cart supports a diaphragm half at a location for refurbishing. The refurbishing may include aluminum oxide blast cleaning, inspection, repair, spill strip replacement and storage. It will be appreciated that the support assemblies 76 are common to each cart such that identical support assemblies 76 may be used to support each diaphragm half without interference with the casing, joint dowels, sealing keys or support devices.

Once the diaphragm halves are refurbished, the process is reversed. Thus, to reinstall the upper diaphragm halves into the upper shell, each cart is maneuvered into a position below the upper shell and in vertical registration with the semi-annular recess for housing the associated upper diaphragm half. When in registration, the hydraulic cylinder is actuated to elevate the platform and hence locate the upper diaphragm half within the semi-annular recess. Once elevated, the bolts and keys at the diametrically opposite midlines are secured one to the other to maintain the upper diaphragm halves in the upper shell. By retracting the hydraulic cylinder, with the bolts 74 disconnected from the upper diaphragm halves, the weight of the upper diaphragm half is transferred from the cart to the bolts and keys, and hence to the upper shell. The platform 60 with the mounted attachment assembly 59 is then lowered further until it clears the upper shell and the cart is then removed from below the upper shell and from between the stands. The process is repeated for each upper diaphragm half until all diaphragm halves are reinstalled into the upper shell. Once reinstalled, the upper shell can be lifted from the stands and joined at its horizontal midline with the lower turbine shell in a conventional manner.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a system for removing and replacing diaphragm halves for a turbine wherein the diaphragm halves have varied midline joints along various turbine stages, a support structure for receiving the diaphragm halves of the turbine comprising:

a cart having a base and a plurality of wheels for movably supporting a diaphragm half carried by said cart;

an attachment assembly carried by said base for vertical movement relative to the base;

a lift mechanism connected between said base and said attachment assembly for moving the attachment assembly vertically relative to the base;

said attachment assembly including a pair of support assemblies for supporting the diaphragm half, each said support assembly including at least one support carried by said attachment assembly for movement in at least one horizontal direction to accommodate the varied configurations of midline joints of the diaphragm halves of the various turbine stages and to support the diaphragms from the platform;

said attachment assembly including a pair of fasteners for securing the attachment assembly and diaphragm half to one another with said support assemblies therebetween.

2. A system according to claim 1 wherein said lift mechanism includes a plurality of support elements pivotally coupled to one another about an axis in a scissors arrangement and a fluid actuator for pivoting the support elements about said axis and displacing said support elements vertically.

3. A system according to claim 2 wherein said fluid actuator includes a fluid cylinder coupled between said support elements and an extendable and retractable enclosure surrounding said support elements and said fluid cylinder.

4. A system according to claim 1 wherein said base includes at least a pair of outrigger assemblies carrying a pair of said wheels, respectively, said outrigger assemblies being movable between extended and retracted positions such that a footprint of the support base is enlarged when the outriggers are extended.

5. A system according to claim 1 wherein each said support assembly includes a pair of spaced support blocks, said pair of blocks being movable transversely along said attachment assembly and one of said blocks being movable in a longitudinal direction of the turbine.

6. A system according to claim 1 wherein said attachment assembly includes a pair of elongated bars having a slot therebetween, said fasteners including bolts extending through said slot and receivable in lifting bolt holes in the diaphragm halves along horizontal midline portions thereof.

7. A system according to claim 1 wherein each said support assembly includes a platform and a pair of spaced support blocks, said pair of blocks being movable transversely along said platform and one of said blocks being movable in a longitudinal direction, said attachment assembly including a pair of elongated bars having a slot therebetween, said fasteners including bolts extending through said slot and receivable in lifting bolt holes in the diaphragm halves along horizontal midline portions thereof, said one block being movably secured to another of said blocks.

8. A system for removing diaphragm halves from and replacing diaphragm halves into an upper shell of a turbine comprising:

a pair of stands spaced one from the other for supporting opposite ends of the upper shell with horizontal midlines thereof resting on the stands, respectively;

a plurality of carts having a plurality of wheels for movement between said stands and below the upper shell;

an attachment assembly carried by each said cart and mounted for vertical movement relative thereto;

a lift mechanism carried by each said cart for raising and lowering said attachment assembly;

said attachment assembly including fasteners for securing the attachment assembly and a selected one of the diaphragm halves to one another, enabling said one diaphragm half for removal from the upper shell and movement of the one diaphragm half and cart laterally of the stands and upper shell.

9. A system according to claim 8 wherein each said stand includes an elongated support beam and support legs at opposite ends of the beam terminating in feet having leveling elements and pivotal connections with said legs.

10. A system according to claim 8 wherein said lift mechanism includes a plurality of support elements pivotally coupled to one another about an axis in a scissors arrangement and a fluid actuator for pivoting the support elements about said axis and displacing said members vertically.

11. A system according to claim 10 wherein said fluid actuator includes a fluid cylinder coupled between said members and an extendable and retractable enclosure surrounding said members and said fluid cylinder.

12. A system according to claim 8 wherein said cart includes a support base and a pair of outrigger assemblies carrying at least a pair of said wheels, respectively, said outrigger assemblies being movable between extended and retracted positions such that a footprint of the support base is enlarged when the outrigger assemblies are extended.

13. A system according to claim 8 wherein said attachment assembly includes a pair of support assemblies for supporting the diaphragm half on the cart, each said assembly including a pair of spaced support blocks movable transversely along said attachment assembly with one of said blocks being movable in a longitudinal direction of the turbine.

14. A system according to claim 13 wherein said attachment assembly includes a pair of elongated bars defining a slot therebetween, a pair of bolts extending through said slot and receivable in lifting bolt holes in the diaphragm halves along horizontal midline portions thereof for securing the diaphragm halves and the attachment assembly to one another.

* * * * *